(12) United States Patent
Jung et al.

(10) Patent No.: US 11,251,474 B2
(45) Date of Patent: Feb. 15, 2022

(54) STRUCTURE AND SYSTEM WITH BATTERY COOLING

(71) Applicant: Samsung Electronics Co., Ltd., Suwon-si (KR)

(72) Inventors: Daebong Jung, Seoul (KR); Jeongsik Ko, Suwon-si (KR); Ji-Young Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 16/367,391

(22) Filed: Mar. 28, 2019

(65) Prior Publication Data
US 2020/0136212 A1    Apr. 30, 2020

(30) Foreign Application Priority Data
Oct. 30, 2018  (KR) .......................... 10-2018-0130934

(51) Int. Cl.
*H01M 10/6556*       (2014.01)
*H01M 10/613*        (2014.01)

(52) U.S. Cl.
CPC ..... *H01M 10/6556* (2015.04); *H01M 10/613* (2015.04)

(58) Field of Classification Search
CPC ......................................... H01M 10/613–6556
See application file for complete search history.

(56) References Cited

U.S. PATENT DOCUMENTS

| | | | |
|---|---|---|---|
| 8,054,038 B2 | 11/2011 | Kelty et al. | |
| 8,117,857 B2 | 2/2012 | Kelty et al. | |
| 8,508,191 B2 | 8/2013 | Kim et al. | |
| 8,618,775 B2 | 12/2013 | Hermann et al. | |
| 8,624,560 B2 | 1/2014 | Ungar et al. | |
| 8,852,772 B2 | 10/2014 | McDonald | |
| 8,961,203 B2 | 2/2015 | Lee | |
| 8,972,213 B2 | 3/2015 | Zhang et al. | |
| 2013/0122331 A1 | 5/2013 | McDonald | |
| 2015/0188203 A1 | 7/2015 | Enomoto et al. | |
| 2016/0156006 A1* | 6/2016 | Hoshino | H01M 10/625 429/96 |

FOREIGN PATENT DOCUMENTS

| | | | |
|---|---|---|---|
| DE | 10 2015 220 856 A1 | 5/2016 | |
| DE | 10 2015 223 408 A1 | 6/2016 | |

(Continued)

OTHER PUBLICATIONS

Extended European search report dated Apr. 1, 2020 in counterpart European patent application No. 19205071.4 ( 7 pages in English).

(Continued)

*Primary Examiner* — Osei K Amponsah
(74) *Attorney, Agent, or Firm* — NSIP Law

(57) ABSTRACT

A cooling structure includes a plurality of bars spaced apart from each other and configured to extend along a first surface of a battery cell; a support configured to support the plurality of bars; and a plurality of flow paths defined by the first surface of the battery cell and a pair of adjacent bars of the plurality of bars, the plurality of flow paths being configured to guide flow of a coolant in contact with the first surface of the battery cell.

12 Claims, 15 Drawing Sheets

(56) References Cited

FOREIGN PATENT DOCUMENTS

| JP | 2008-159439 A | 7/2008 |
| JP | 2014-504440 A | 2/2014 |
| KR | 10-2015-0025207 A | 3/2015 |
| KR | 10-2017-0021122 A | 2/2017 |
| WO | WO 2017/067923 A1 | 4/2017 |

OTHER PUBLICATIONS

"Xpand Battery System Controllers: BDU (w/SCU) and MCU", *XALT Energy*, May 11, 2017 (2 pages in English).

\* cited by examiner

12

STRUCTURE AND SYSTEM WITH BATTERY COOLING

CROSS-REFERENCE TO RELATED APPLICATIONS

This application claims the benefit under 35 USC § 119(a) of Korean Patent Application No. 10-2018-0130934, filed on Oct. 30, 2018, in the Korean Intellectual Property Office, the entire disclosure of which is incorporated herein by reference for all purposes.

BACKGROUND

1. Field

The following description relates to a structure and system with battery cooling.

2. Description of Related Art

Technologies of cooling battery cells that supply electric power to be used in, for example, vehicles, mobile phones, and the like, have been developed. Methods of cooling a battery cell include a direct cooling method and an indirect cooling method. The direct cooling method refers to a heat transfer method in which a refrigerant directly contacts an object to be cooled, and the indirect cooling method refers to a heat transfer between a refrigerant and an object to be cooled, using at least one medium layer between the refrigerant and the object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a cooling structure includes: a plurality of bars spaced apart from each other and configured to extend along a first surface of a battery cell; a support configured to support the plurality of bars; and a plurality of flow paths defined by the first surface of the battery cell and a pair of adjacent bars of the plurality of bars, the plurality of flow paths being configured to guide flow of a coolant in contact with the first surface of the battery cell.

The cooling structure may further include: a sealing portion configured to enclose the plurality of bars and the plurality of flow paths.

The sealing portion may include: a longitudinal direction member extending in a longitudinal direction of the plurality of bars and configured to contact the first surface of the battery cell; an arrangement direction member extending in an arrangement direction of the plurality of bars and configured to contact a second surface of the battery cell; and a connection member configured to connect the longitudinal direction member and the arrangement direction member and to contact an edge portion between the first surface and the second surface of the battery cell.

The support may include: an inflow support comprising an inflow passage configured to guide inflow of the coolant to the plurality of flow paths; and an outflow support comprising an outflow passage configured to guide outflow of the coolant from the plurality of flow paths.

The inflow passage may include a plurality of inflow ports, the outflow passage comprises a plurality of outflow ports, one end of each of the plurality of bars is connected between a pair of adjacent inflow ports, and another end of each of the plurality of bars is connected between a pair of adjacent outflow ports.

The inflow support further may include a first sealing member configured to enclose the inflow passage, and the outflow support further comprises a second sealing member configured to enclose the outflow passage.

The first sealing member may be configured to enclose the inflow passage to form a closed loop, and the second sealing member is configured to enclose the outflow passage to form another closed loop.

The support may include a flange extending in a plane perpendicular to a longitudinal direction of the plurality of bars.

The cooling structure may include: a plurality of connectors configured to connect the support to an end portion of each of the plurality of bars.

The connector may be curved inwardly to be configured to contact an edge portion the battery cell.

The support and the plurality of bars may be formed of insulative materials.

The cooling structure may include: an upper frame disposed above the plurality of bars in an arrangement direction of the plurality of bars; and a lower frame disposed below the plurality of bars in the arrangement direction of the plurality of bars.

A thickness of the upper frame and a thickness of the lower frame may be greater than a thickness of the plurality of bars in the arrangement direction of the plurality of bars, and the upper frame and the lower frame may be formed of a more flexible material than a material of the plurality of bars.

The first surface of the battery cell may be larger than plural other surfaces of the battery cell.

The plurality of flow paths may be in contact with only a central portion of the battery cell in an arrangement direction of the plurality of bars.

The plurality of bars may be arranged in a vertical direction of the battery cell, and a gap between a pair of adjacent bars in a central portion of the battery cell in the vertical direction is greater than a gap between a pair of adjacent bars in an upper portion or a lower portion of the battery cell in the vertical direction.

The cooling structure may include: the battery cell and a second battery cell; and the plurality of bars, the support, and the plurality of flow paths may be interposed between the battery cell and the second battery cell.

In another general aspect, a battery system includes: a first battery cell; a second battery cell; and a first cooling structure interposed between the first battery cell and the second battery cell, and comprising: a plurality of first bars spaced apart from each other and configured to extend along a surface of the first battery cell and a surface of the second battery cell; and a plurality of first flow paths defined by the surface of the first battery cell, the surface of the second battery cell, and a pair of adjacent first bars of the plurality of first bars, the plurality of first flow paths being configured to guide flow of a coolant in contact with the surface of the first battery cell and the surface of the second battery cell.

The first cooling structure may include: a first sealing portion disposed at one side of the first cooling structure facing the surface of the first battery cell and configured to enclose the plurality of first bars and the plurality of first flow paths; and a second sealing portion disposed at another side of the first cooling structure facing the surface of the second battery cell and configured to enclose the plurality of first bars and the plurality of first flow paths.

The battery system may include: a second cooling structure disposed to face the first cooling structure based on the second battery cell, and comprising: a plurality of second bars spaced apart from each other and configured to extend along another surface of the second battery cell; a plurality of second flow paths configured to guide flow of the coolant in direct contact with the other surface of the second battery cell; and a closing portion configured to define the plurality of second flow paths together with the other surface of the second battery cell and a pair of adjacent second bars.

The battery system may include: a fixer configured to press the first battery cell, the second battery cell, and the first cooling structure in a direction perpendicular to a direction of the flow of the coolant.

In another general aspect, a battery system includes: a first battery cell; a first cooling structure configured to cool the first battery cell and comprising: a plurality of first bars spaced apart from each other and configured to extend along a surface the first battery cell, a plurality of first flow paths defined by the surface of the first battery cell and a pair of adjacent first bars, and configured to guide flow of a coolant in contact with the surface of the first battery cell, and a first support configured to support the plurality of first bars; a second battery cell; and a second cooling structure configured to cool the second battery cell and comprising: a plurality of second bars spaced apart from each other and configured to extend along a surface of the second battery cell, a plurality of second flow paths defined by the surface of the second battery cell and a pair of adjacent second bars, and configured to guide flow of the coolant in contact with the surface of the second battery cell, and a second support configured to support the plurality of second bars, and coupled with the first support so that the plurality of first flow paths and the plurality of second flow paths fluidly communicate with each other.

Each of the first support and the second support may include: an inflow support comprising an inflow passage configured to respectively guide inflow of the coolant to the plurality of first flow paths or the plurality of second flow paths; and an outflow support comprising an outflow passage configured to respectively guide outflow of the coolant from the plurality of first flow paths or the plurality of second flow paths, wherein the outflow passage of the outflow support of the first support is engaged with the inflow passage of the inflow support of the second support.

One of the inflow support and the outflow support may include a concave portion recessed inwardly, and the other one of the inflow support and the outflow support comprises a protruding portion protruding outwardly and configured to engaged with the concave portion.

The first support and the second support may each include a flange configured to partition the first battery cell and the second battery cell and extending in a plane perpendicular to a longitudinal direction of each of the plurality of first bars and the plurality of second bars.

In another general aspect, a cooling system includes: a first cooling structure configured to be disposed at a first surface of a battery and comprising a first bar and a second bar each configured to extend in a first direction along the surface to form a first coolant flow path; and a second cooling structure configured to be disposed at a second surface of the battery, opposite the first surface, and comprising a third and a fourth bar configured to extend in the first direction along the second surface to form a second coolant flow path.

The first cooling structure may be separated from the second cooling structure in a second direction perpendicular to the first direction to allow an expansion of the battery in the second direction.

Either one or both of the first and the second cooling structures may be configured to maintain a cross-section of the respective first or second coolant path in response to an expansion of the battery in the second direction.

The first coolant flow path may be bound by a lower surface of the first bar, an upper surface of the second bar, the first surface of the battery, and either a surface of another battery or a closing portion of the first cooling structure, and the second coolant flow path may be bound by a lower surface of the third bar, an upper surface of the fourth bar, the second surface of the battery, and either a surface of an additional battery or a closing portion of the second cooling structure.

Other features and aspects will be apparent from the following detailed description, the drawings, and the claims.

Figure 1:
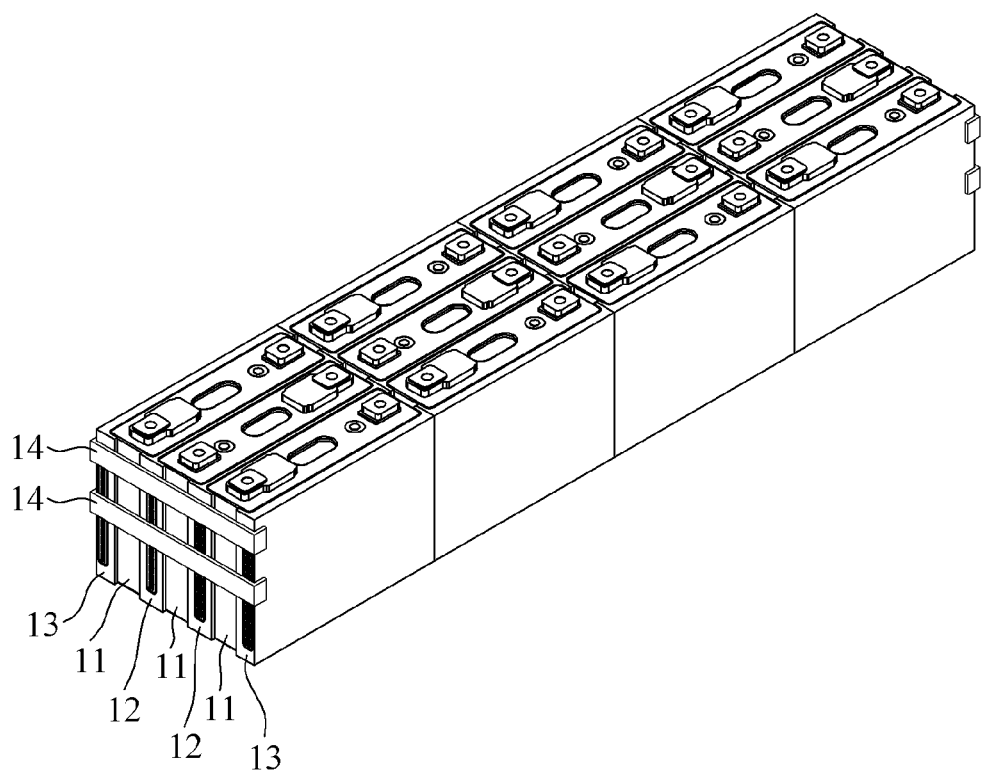
FIG. 1 is a perspective view illustrating an example of a battery system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Hereinafter, examples will be described with reference to the accompanying drawings. In the following description, the same elements will be designated by the same reference numerals although they are shown in different drawings. Also, in the following description of examples, a detailed description of known functions and configurations incorporated herein will be omitted when it is deemed that such description will cause ambiguous interpretation of the examples.

Also, to describe components according to examples, the terms first, second, A, B, (a), (b), etc. may be used herein. These terms are merely used to distinguish one component from another, but not to define an essence, order or sequence of the components. It should be noted that if it is described in the specification that one component is "connected", "coupled", or "joined" to another component, a third component may be "connected," "coupled," and "joined" between the first and second components, although the first component may be directly connected, coupled or joined to the second component.

A component included in one example and a component having a common function will be described using the same names in other examples. Description of one example may be applied to other examples, and overlapping detailed descriptions thereof will be omitted, unless mentioned otherwise.

Figure 2:
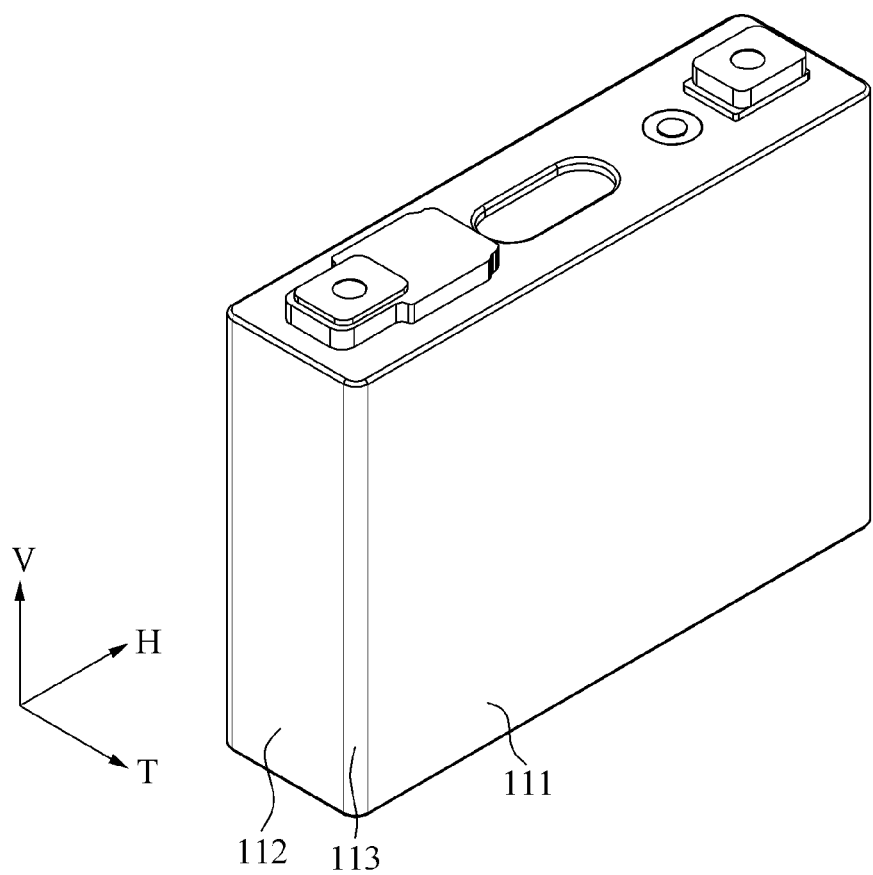
FIG. 2 is a perspective view illustrating an example of a battery cell.

FIG. 1 is a perspective view illustrating an example of a battery system 1, and FIG. 2 is a perspective view illustrating an example of a battery cell 11.

Referring to FIGS. 1 and 2, the battery system 1 supplies a power to or in an object. The object includes, for example, a vehicle, a home appliance, or a portable electronic device, however, examples are not limited thereto. Also, although the battery system 1 is illustrating as including the battery cell 11 having a shape of a rectangle with four rounded edge portions 113 parallel to a height direction V of the battery cell 11, examples also include various battery systems including varied battery cell shapes.

The battery system 1 includes a plurality of battery cells 11, a plurality of cooling structures 12 and 13, and a plurality of fixers 14.

The plurality of battery cells 11 supply a power to an object. Each of the plurality of battery cells 11 includes a large area portion (e.g., a large surface) 111, a small area portion (e.g., a small surface) 112, and an edge portion 113 between the large area portion 111 and the small area portion 112, noting that the large area portion is larger than the small area portion. For example, the edge portion 113 is curved outwardly. The plurality of battery cells 11 are arranged so that large area portions 111 face each other or small area portions 112 face each other.

The plurality of cooling structures 12 and 13 cool the plurality of battery cells 11. Also, the plurality of cooling structures 12 and 13 press the plurality of battery cells 11. When a predetermined pressure is applied to the plurality of battery cells 11, a power supply efficiency of the battery cells 11 may be enhanced.

The plurality of cooling structures 12 and 13 include a first cooling structure 12 and a second cooling structure 13. The first cooling structure 12 is interposed between a pair of adjacent battery cells 11 so that a flow path 123 of FIG. 3 through which a coolant (e.g., a refrigerant) for cooling the plurality of battery cells 11 flows is formed between large area portions 111 of the battery cells 11. The refrigerant includes, for example, a liquid refrigerant, such as oil or water, or a gas refrigerant, such as air. The second cooling structure 13 is installed on a large area portion 111 of an outermost battery cell 11 among the plurality of battery cells 11.

The plurality of fixers 14 press the plurality of battery cells 11 and the plurality of cooling structures 12 and 13. For example, the plurality of fixers 14 are installed on a small area portion 112 of an outermost battery cell 11 among the plurality of battery cells 11. By the above structure, the plurality of cooling structures 12 and 13 apply a desired pressure to the plurality of battery cells 11, and thus the power supply efficiency of the plurality of battery cells 11 may be advantageously enhanced.

Figure 3:
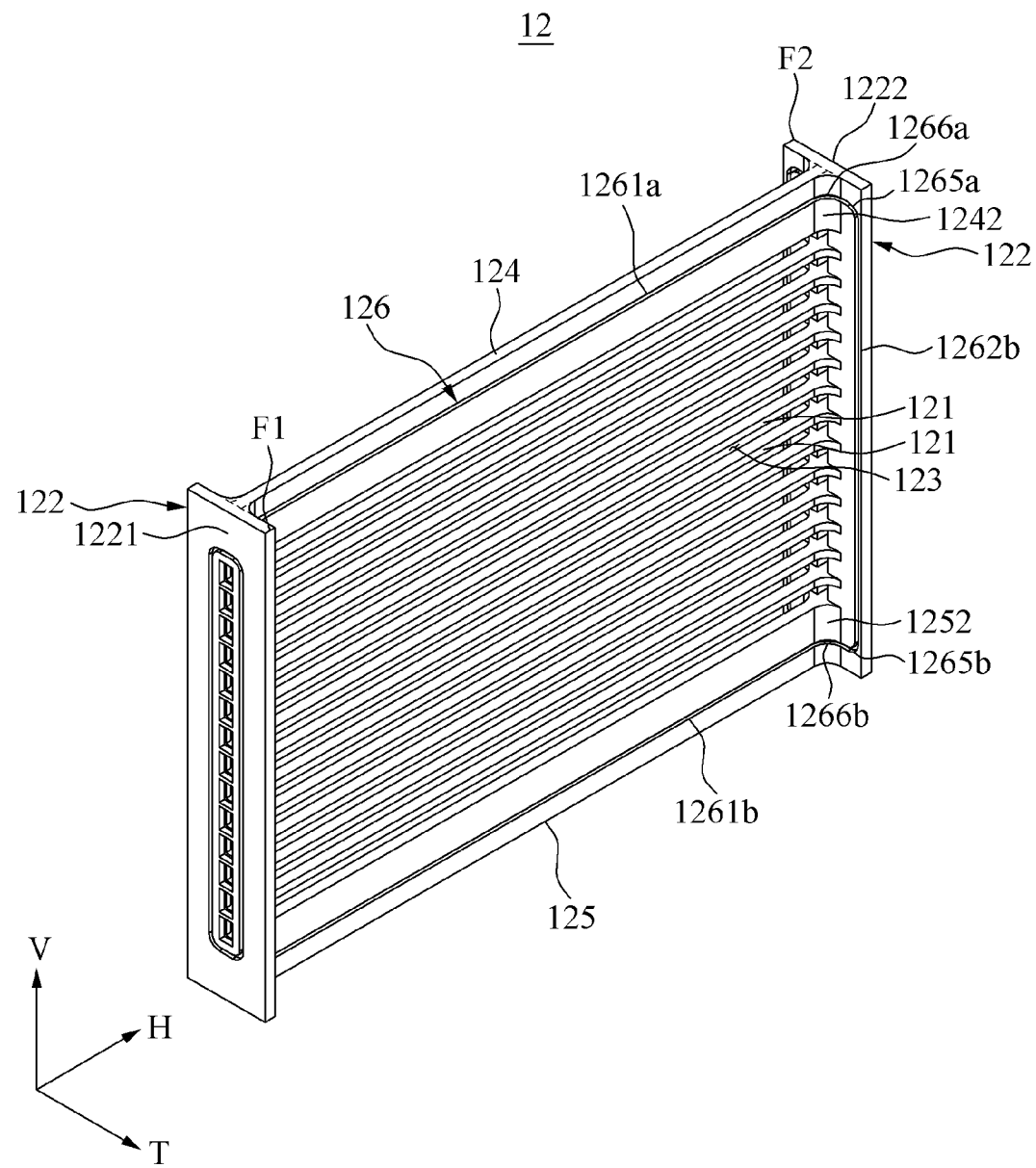
FIG. 3 is a perspective view illustrating an example of a cooling structure.
Figure 4:
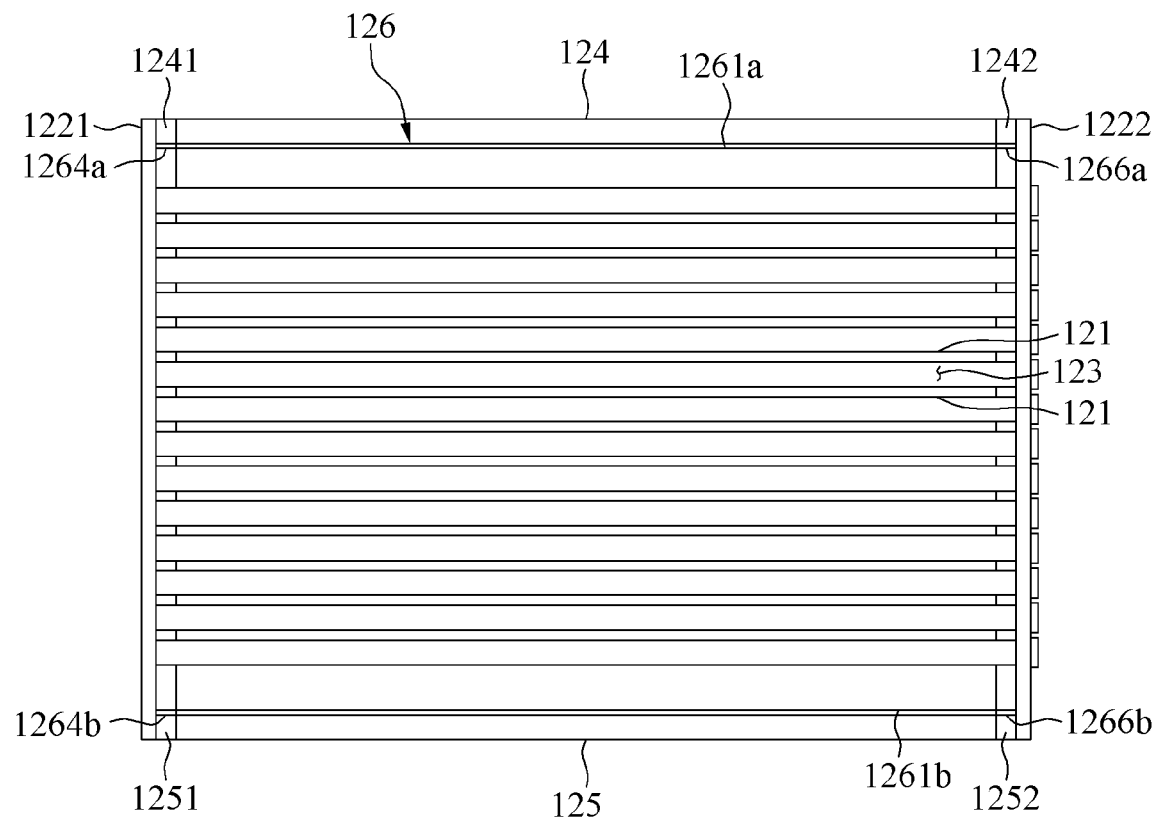
FIG. 4 is a front view illustrating an example of a cooling structure.
Figure 5:
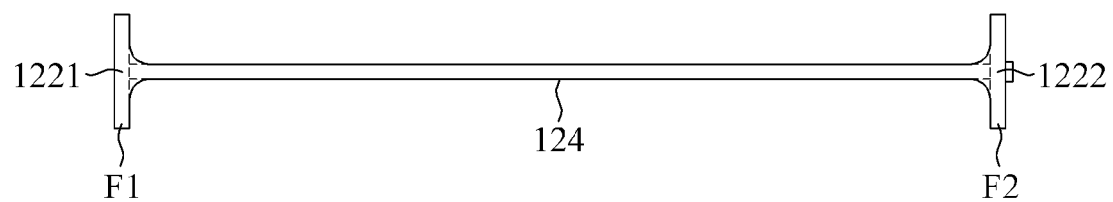
FIG. 5 is a plan view illustrating an example of a cooling structure.

FIG. 3 is a perspective view illustrating an example of a cooling structure 12, FIG. 4 is a front view of a cooling structure 12, and FIG. 5 is a plan view of a cooling structure 12.

Referring to FIGS. 1 through 5, the cooling structure 12 includes a plurality of bars 121, a support 122, a plurality of flow paths 123, an upper frame 124, a lower frame 125, and a sealing portion 126. As a non-limiting example, the cooling structure 12 with respect to FIGS. 1 through 5 may be a same cooling structure.

The plurality of bars 121 support and press a battery cell 11. The plurality of bars 121 have a length extending in one direction. For example, the plurality of bars 121 extend a longitudinal direction H of the battery cell 11. The plurality of bars 121 are spaced apart from each other. For example, an arrangement direction V of the plurality of bars 121 corresponds to a height direction V of the battery cell 11. The plurality of bars 121 are disposed between a pair of adjacent battery cells 11. For example, both sides of the plurality of bars 121 are disposed between large area portions 111 of a pair of adjacent battery cells 11. Also, both sides of the plurality of bars 121 contact the large area portions 111 of the adjacent battery cells 11.

The support 122 supports the plurality of bars 121. The support 122 includes an inflow support 1221 that is disposed on an inlet side and to which a refrigerant for cooling the battery cell 11 flows, and an outflow support 1222 that is disposed on an outlet side and from which the refrigerant flows. The inflow support 1221 extends in the arrangement direction V of the plurality of bars 121 and connects first end portions of the plurality of bars 121. The outflow support 1222 extends in the arrangement direction V of the plurality of bars 121 and connects second end portions opposite the first end portions of the plurality of bars 121.

The inflow support 1221 includes an inflow flange F1 that extends in a plane perpendicular to the longitudinal direction H of the plurality of bars 121 on the first end portions of the plurality of bars 121. The outflow support 1222 includes an outflow flange F2 that extends in the plane perpendicular to the longitudinal direction H of the plurality of bars 121 on the second end portions of the plurality of bars 121. Each of the inflow flange F1 and the outflow flange F2 is disposed between a pair of adjacent battery cells 11 so that a gap between the adjacent battery cells 11 is formed. For example, each of the inflow flange F1 and the outflow flange F2 is disposed between small area portions 112 of a pair of adjacent battery cells 11. By the above structure, adjacent battery cells 11 are electrically isolated. Also, although a thermal abuse or thermal runaway occurs in arbitrary battery cell 11, heat of the thermal runaway is prevented from being transferred from the battery cell 11 to a neighboring battery cell 11.

The plurality of flow paths 123 guide flow of refrigerants in direct contact with battery cells 11. The plurality of flow paths 123 are defined by surfaces of battery cells 11 and a pair of adjacent bars 121. For example, the plurality of flow paths 123 are defined by large area portions 111 among surfaces of battery cells 11, and by a top surface and a bottom surface that do not press a surface of a battery cell 11 among surfaces of a pair of adjacent bars 121. Since the refrigerant is in direct contact with a battery cell 11 as described above, heat is able to be directly exchanged even though a heat transfer member, for example, a thermal pad, a pipe or a cooling fin, is not interposed between battery cells 11 and a flowing refrigerant, to enhance a cooling efficiency. Also, by the plurality of flow paths 123, a problem of a distribution of the refrigerant being propelled downward due to an influence of the gravity may be reduced, and thus a temperature variation may be advantageously reduced in battery cells 11, which in turn may greatly improve a lifespan of the battery cells 11.

The plurality of bars 121 are spaced apart from each other at suitable intervals. Based on the above structure, a deformation (for example, a swelling) of a battery cell 11, or a deformation of the plurality of flow paths 123 due to an external force, may be advantageously prevented while securing the plurality of flow paths 123 through which refrigerants flow in direct contact with battery cells 11. Also, based on the above structure, a flow rate of a refrigerant flowing through the plurality of flow paths 123 may be advantageously determined or controlled by design.

In an example, the plurality of bars 121 are designed to be spaced apart from each other at the same intervals, and thus the plurality of flow paths 123 have the same cross-sectional areas.

In another example, the plurality of bars 121 are spaced apart from each other at different intervals so that a portion of a battery cell 11 with a greatest increase in a temperature is intensively cooled. For example, when a central portion of a battery cell 11 has a highest operating temperature, a gap between a pair of adjacent bars 121 in the central portion of the battery cell 11 is greater than a gap between a pair of adjacent bars 121 in an upper portion or a lower portion of the battery cell 11. Based on the above structure, the central portion of the battery cell may be more intensively cooled than the upper or the lower portion. Accordingly, cooling intensity is in proportion to battery temperature, and thus coolant may be allocated efficiently, and thus a cooling efficiency may be advantageously enhanced.

In still another example, the plurality of flow paths 123 are located in only a central portion of a battery cell 11. In this example, the plurality of bars 121 are spaced apart from each other in only the central portion of the battery cell 11, and a refrigerant flow path is not formed in the other portions in a space of a pair of adjacent battery cells 11. Based on the above structure, the total cross-sectional area of the plurality of flow paths 123 is reduced relative to when the plurality of flow paths 123 are located along an entire portion of the battery cell 11, and thus a cooling efficiency of a predetermined portion is advantageously enhanced.

The upper frame 124 is disposed above the plurality of bars 121 and connects the inflow support 1221 and the outflow support 1222. The upper frame 124 extends in the longitudinal direction H of the plurality of bars 121.

The upper frame 124 includes a first upper frame connector 1241 that connects the upper frame 124 and the inflow support 1221, and a second upper frame connector 1242 that connects the upper frame 124 and the outflow support 1222. The first upper frame connector 1241 is formed on a first end portion of the upper frame 124, and the second upper frame connector 1242 is formed on a second end portion of the upper frame 124 opposite the first end portion. For example, the first upper frame connector 1241 and the second upper frame connector 1242 are curved inwardly toward a battery cell 11 to contact an upper portion of the battery cell 11.

The lower frame 125 is disposed below the plurality of bars 121, and connects the inflow support 1221 and the outflow support 1222. The lower frame 125 extends in the longitudinal direction H of the plurality of bars 121.

The lower frame 125 includes a first lower frame connector 1251 that connects the lower frame 125 and the inflow support 1221, and a second lower frame connector 1252 that connects the lower frame 125 and the outflow support 1222. The first lower frame connector 1251 is formed on a first end portion of the lower frame 125, and the second lower frame connector 1252 is formed on a second end portion of the lower frame 125 opposite the first end portion. For example, the first lower frame connector 1251 and the second lower frame connector 1252 are curved inwardly toward a battery cell 11 to contact a lower portion of the battery cell 11.

Components having the same configuration as the first upper frame connector 1241, the second upper frame connector 1242, the first lower frame connector 1251 and the second lower frame connector 1252 may also be formed on one side of a cooling structure 12 facing another battery cell 11.

The upper frame 124 and the lower frame 125 are formed of more flexible and/or compressible materials than those of the plurality of bars 121, and a thickness of each of the upper frame 124 and the lower frame 125 in the direction V is greater than those of the plurality of bars 121. Based on the above structure, sealability of the cooling structure 12 may be advantageously enhanced. Also, even if a battery cell 11 is deformed beyond an expected range, leakage of refrigerants from the plurality of flow paths 123 may be advantageously prevented by tolerating the above deformation to a predetermined level.

The plurality of bars 121, the support 122, the upper frame 124 and the lower frame 125 are formed of insulative materials. An insulative material includes, for example, any material suitable for an electrical isolation between a pair of adjacent battery cells 11. For example, the insulative material may include plastic.

The sealing portion 126 encloses the plurality of bars 121 and the plurality of flow paths 123. The sealing portion 126 forms a heat exchange space between a pair of adjacent battery cells 11 and the cooling structure 12. For example, the heat exchange space is defined by the plurality of bars 121, the support 122, the plurality of flow paths 123, the upper frame 124, the lower frame 125, the sealing portion 126, and surfaces of the pair of adjacent battery cells 11. The heat exchange space is closed from the outside except for an inflow passage P1 of FIG. 6 and an outflow passage P2 of FIG. 9. Sealing portions 126 are installed on one side of a cooling structure 12 facing a large area portion 111 of one of a pair of adjacent battery cells 11, and another side of the cooling structure 12 facing a large area portion 111 of the other of the pair of adjacent battery cells 11, respectively.

Figure 12:
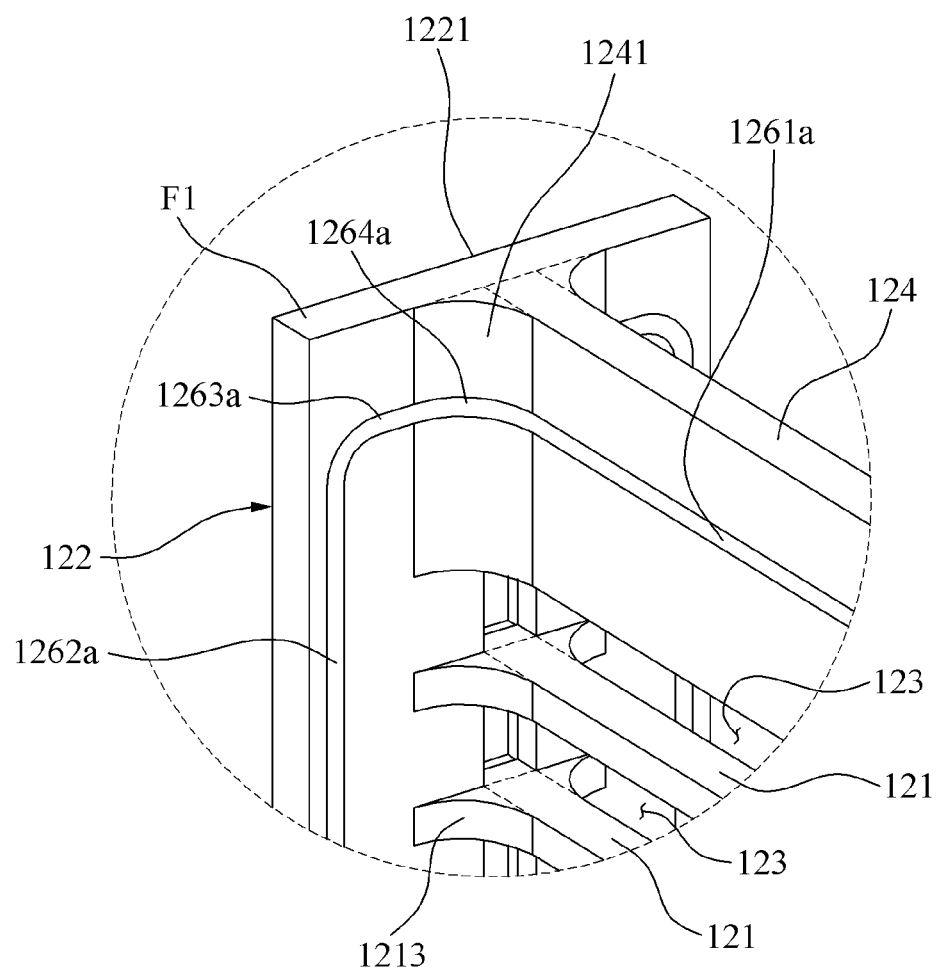
FIG. 12 illustrates an example of an inflow support connected to a plurality of bars and an upper frame.

The sealing portion 126 includes longitudinal direction members 1261a and 1261b, arrangement direction members 1262a and 1262b of FIG. 12, and connection members 1263a, 1264a, 1264b, 1265a, 1265b, 1266a and 1266b of FIG. 12.

The longitudinal direction members 1261a and 1261b extend in the longitudinal direction H of the plurality of bars 121 and contact a first surface of a battery cell 11. For example, the first surface is a large area portion 111 of the battery cell 11. The longitudinal direction members 1261a and 1261b include an upper longitudinal direction member 1261a installed in the upper frame 124, and a lower longitudinal direction member 1261b installed in the lower frame 125.

The arrangement direction members 1262a and 1262b extend in the arrangement direction V of the plurality of bars 121 and contact a second surface of the battery cell 11. For example, the second surface is a small area portion 112 of the battery cell 11. The arrangement direction members 1262a and 1262b include an inflow arrangement direction member 1262a of FIG. 12 installed in the inflow support 1221, and an outflow arrangement direction member 1262b of FIG. 3 installed in the outflow support 1222.

The connection members 1263a, 1264a, 1264b, 1265a, 1265b, 1266a and 1266b connect the longitudinal direction members 1261a and 1261b and the arrangement direction members 1262a and 1262b, and contact an edge portion between the first surface (e.g., a large area portion 111) and the second surface (e.g., the small area portion 112) of the battery cell 11. The connection members 1263a, 1264a, 1264b, 1265a, 1265b, 1266a and 1266b include upper connection members 1263a, 1264a, 1265a and 1266a, and lower connection members 1264b, 1265b and 1266b.

The upper connection members 1263a, 1264a, 1265a and 1266a include the first upper connection member 1263a that is connected to the inflow arrangement direction member 1262a and that is formed in the inflow support 1221, the second upper connection member 1264a that connects the first upper connection member 1263a and the upper longitudinal direction member 1261a and that is formed in the first upper frame connector 1241, the third upper connection member 1265a that is connected to the outflow arrangement direction member 1262b and that is formed in the outflow support 1222, and the fourth upper connection member 1266a that connects the third upper connection member 1265a and the upper longitudinal direction member 1261a and that is formed in the second upper frame connector 1242.

The lower connection members 1264b, 1265b and 1266b include the first lower connection member that is connected to the inflow arrangement direction member 1262a and that is formed in the inflow support 1221, the second lower connection member 1264b that connects the first lower connection member and the lower longitudinal direction member 1261b and that is formed in the first lower frame connector 1251, the third lower connection member 1265b that is connected to the outflow arrangement direction member 1262b and that is formed in the outflow support 1222, and the fourth lower connection member 1266b that connects the third lower connection member 1265b and the lower longitudinal direction member 1261b and that is formed in the second lower frame connector 1252.

By the above structure, the heat exchange space determined by the plurality of bars 121, the support 122, the plurality of flow paths 123, the upper frame 124, the lower frame 125, the sealing portion 126 and the surfaces of the pair of battery cells 11 has an advantageous three-dimensional (3D) structure of sealing the heat exchange space from the outside.

Figure 6:
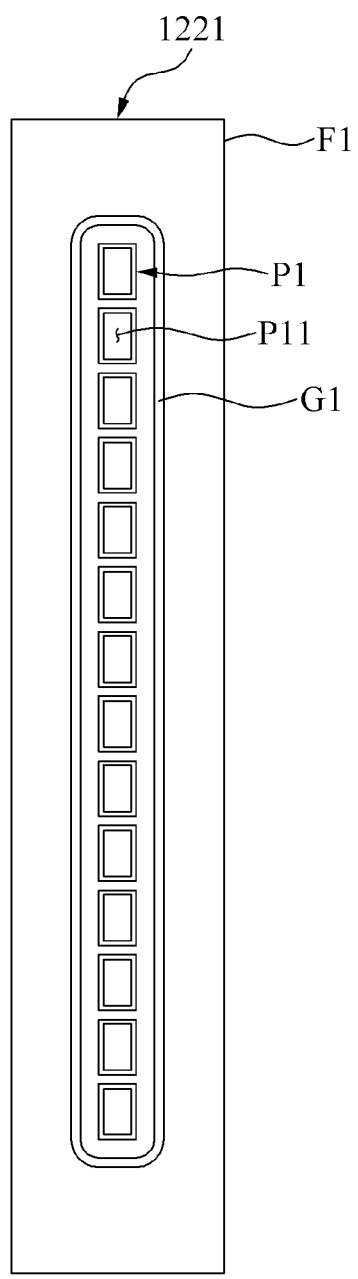
FIG. 6 illustrates an example of an inflow support.
Figure 7:
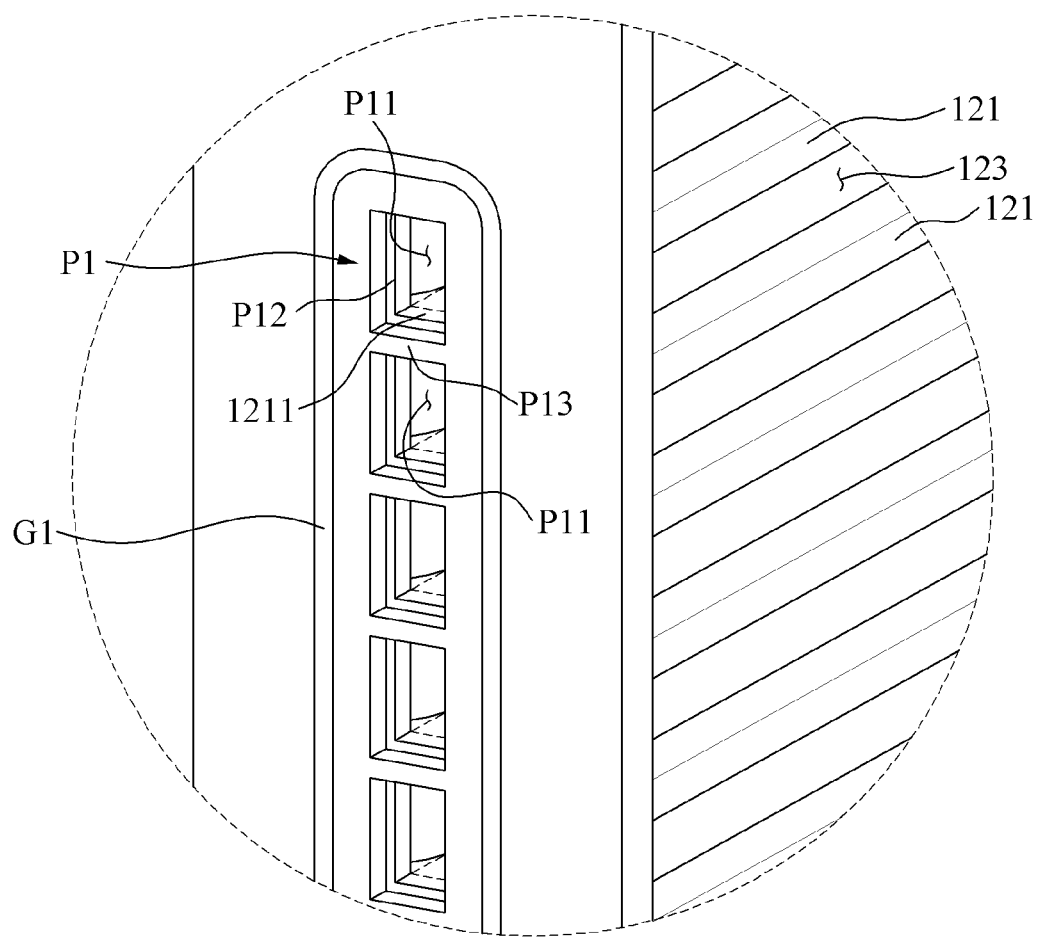
FIG. 7 is a perspective view illustrating an example of a portion of an inflow support.

FIG. 6 illustrates an example of the inflow support 1221, and FIG. 7 is a perspective view illustrating an example of a portion of an inflow support (e.g., a portion of the inflow support 1221 of FIG. 6).

Referring to FIGS. 6 and 7, the inflow support 1221 includes the inflow flange F1, the inflow passage P1, and a first sealing member G1. The inflow flange F1 extends in the plane perpendicular to the longitudinal direction H of the plurality of bars 121.

The inflow passage P1 guides inflow of a refrigerant to the plurality of flow paths 123. The inflow passage P1 includes a plurality of inflow ports P11, a concave portion P12, and a first partition P13.

The plurality of inflow ports P11 fluidly communicate with the plurality of flow paths 123. The plurality of inflow ports P11 are spaced apart from each other in a height direction V of the inflow support 1221 (wherein, e.g., a height direction V of the inflow support 1221 corresponds to an arrangement direction V of the plurality of bars 121 and a height direction V of the battery cell 11). By a structure of the inflow passage P1 including the plurality of inflow ports P11, flow rates of refrigerants flowing through the plurality of flow paths 123 may be configured to be individually controlled. For example, a flow rate of a refrigerant flowing through a flow path 123 disposed in a central portion of the battery cell 11 of FIG. 2 among the plurality of flow paths 123 is controlled to increase, and a flow rate of a refrigerant flowing through a flow path 123 disposed in an upper portion or lower portion of the battery cell 11 among the plurality of flow paths 123 is controlled to decrease.

Figure 10:
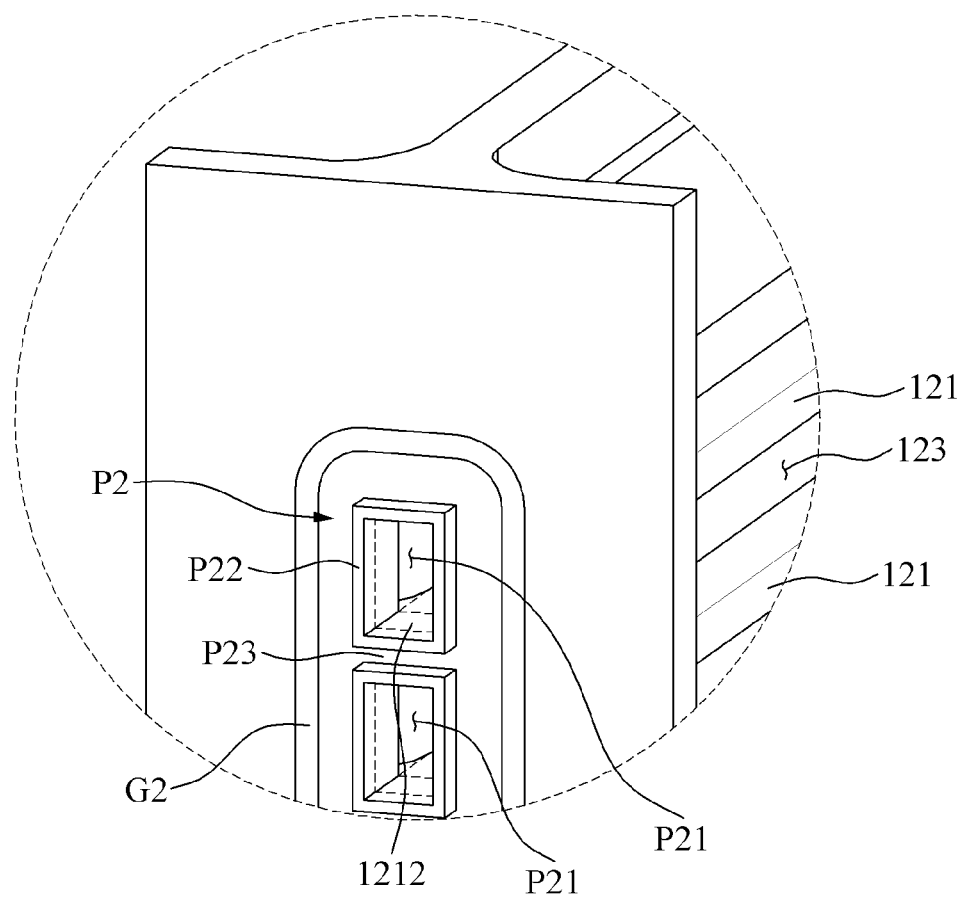
FIG. 10 is a perspective view illustrating an example of a portion of an outflow support.

The concave portion P12 is engaged with a protruding portion P22 (e.g., as shown in FIG. 10) of the outflow passage P2 of the outflow support 1222. The concave portion P12 is recessed inwardly toward the inflow support 1221 and is formed in a circumferential direction of the inflow port P11. Also, the concave portion P12 has a stepped structure in which steps are formed based on a flow direction of a refrigerant passing through the inflow port P1.

A first end portion 1211 of each of the plurality of bars 121 is connected between a pair of adjacent inflow ports P11. For example, the first end portion 1211 forms an upper wall or a lower wall of the inflow port P11 and is connected to the concave portion P12.

The first partition P13 partitions the inflow passage P1 to form a plurality of inflow ports P11. The first partition P13 is located between a pair of adjacent inflow ports P11. The first partition P13 overlaps a bar 121 in a longitudinal direction H of the bar 121. The first partition P13 and a first end portion 1211 of the bar 121 are fixed to each other. A stepped structure of the concave portion P12 is formed between the first partition P13 and a first end portion 1211 of each of the plurality of bars 121.

The first sealing member G1 seals the inflow passage P1 from the outside. For example, the first sealing member G1 encloses the inflow passage P1 to form a closed loop.

Figure 8:
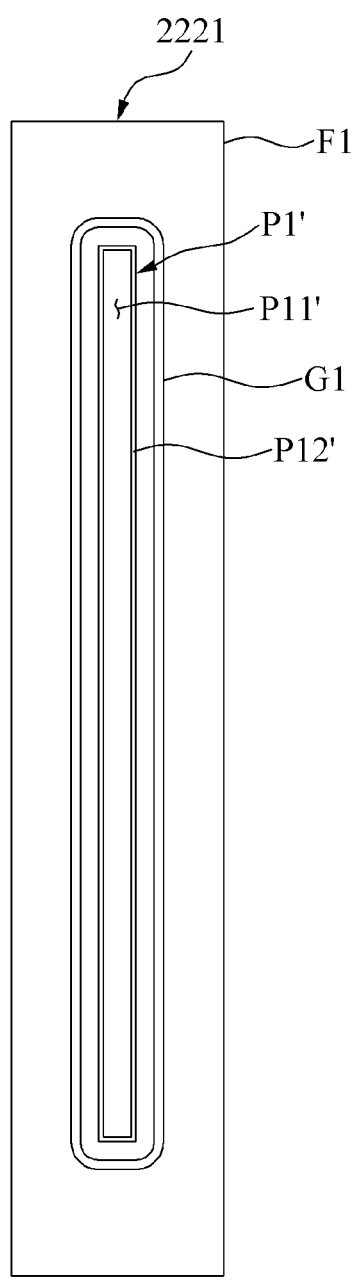
FIG. 8 illustrates an example of an inflow support.

FIG. 8 illustrates an example of an inflow support 2221.

Referring to FIG. 8, the inflow support 2221 includes an inflow flange F1, an inflow passage P1' and a first sealing member G1.

The inflow passage P1' includes a single inflow port P11' and a concave portion P12'. For example, the inflow port P11' has a shape of a slot extending in a height direction of the inflow support 2221. The concave portion P12' is recessed inwardly toward the inflow support 2221 and is formed in a circumferential direction of the inflow port P11'. The inflow port P11' shares a plurality of flow paths (not shown) and fluidly communicates with the plurality of flow paths.

For example, an inflow support may include at least one inflow port that shares a portion of a plurality of flow paths. The inflow support may have a manifold structure that guides flow of a refrigerant from one inflow port to the plurality of flow paths. For example, a plurality of inflow ports may share a pair of adjacent flow paths. In an example, "10" flow paths are provided and "5" inflow ports are provided.

Figure 9:
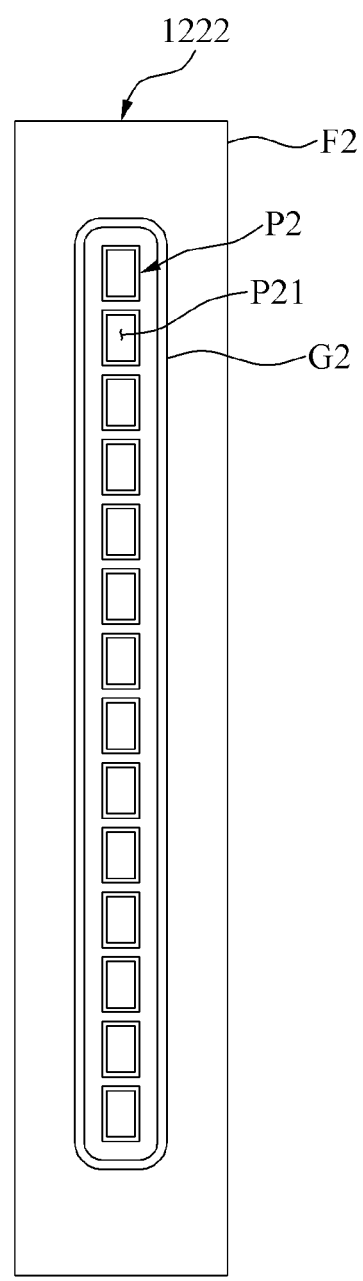
FIG. 9 illustrates an example of an outflow support.

FIG. 9 illustrates an example of the outflow support 1222, and FIG. 10 illustrates an example of a portion of an outflow support (e.g., a portion of the outflow support 1222 of FIG. 9).

Referring to FIGS. 9 and 10, the outflow support 1222 includes the outflow flange F2, the outflow passage P2, and a second sealing member G2. The outflow flange F2 extends in the plane perpendicular to the longitudinal direction H of the plurality of bars 121.

The outflow passage P2 guides outflow of a refrigerant from the plurality of flow paths 123. The outflow passage P2 includes a plurality of outflow ports P21, the protruding portion P22, and a second partition P23.

The plurality of outflow ports P21 fluidly communicate with the plurality of flow paths 123. The plurality of outflow ports P21 are spaced apart from each other in a height direction of the outflow support 1222.

The protruding portion P22 is engaged with the concave portion P12 of the inflow passage P1 of the inflow support 1221. The protruding portion P22 protrudes outwardly from the outflow support 1222 and is formed in a circumferential direction of the outflow port P21.

For example, one cooling structure 12 and another cooling structure 12 are coupled as shown in FIG. 1. In this example, a degree of coupling between the cooling structures 12 is enhanced by an engagement structure between the concave portion P12 and the protruding portion P22.

Unlike the drawings, the inflow passage P1 of FIG. 7 of the inflow support 1221 of FIG. 6 may include the protruding portion P22, and the outflow passage P2 of the outflow support 1222 may include the concave portion P12 of FIG. 7.

A second end portion 1212 of each of the plurality of bars 121 forms an upper wall or a lower wall of a pair of adjacent outflow ports P21 and is connected to the protruding portion P22.

The second partition P23 partitions the outflow passage P2 to form the plurality of outflow ports P21. The second partition P23 is located between a pair of adjacent outflow ports P21. The second partition P23 overlaps a bar 121 based on a longitudinal direction of the bar 12. The second partition P23 and a second end portion 1212 of the bar 121 are fixed to each other.

The second sealing member G2 seals the outflow passage P2 from the outside. For example, the second sealing member G2 encloses the outflow passage P2 to form a closed loop. Based on the above structure, outflow of refrigerants passing through the outflow support 1222 of FIG. 3 of one of a pair of adjacent cooling structures 12 of FIG. 1 and the inflow support 1221 of FIG. 3 of the other one, together with the above-described first sealing member G1 of FIG. 6, when the cooling structures 12 are coupled may be advantageously prevented.

Figure 11:
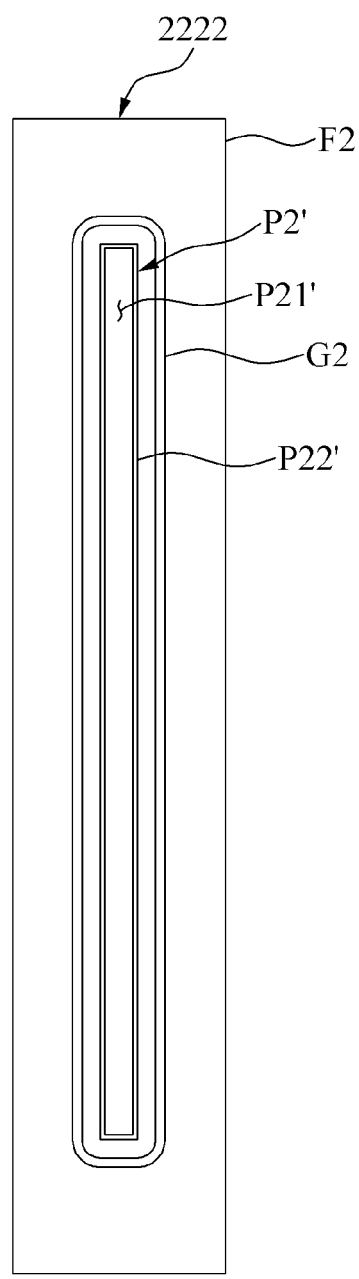
FIG. 11 illustrates an example of an outflow support.

FIG. 11 illustrates an example of an outflow support 2222.

Referring to FIG. 11, the outflow support 2222 includes an outflow flange F2, an outflow passage P2', and a second sealing member G2.

The outflow passage P2' includes a single outflow port P21' and a protruding portion P22'. For example, the outflow port P21' has a shape of a slot extending in a height direction of the outflow support 2222. The protruding portion P22' protrudes outwardly from the outflow support 2222 and is formed in a circumferential direction of the outflow port P21'. The outflow port P21' shares a plurality of flow paths (not shown) and fluidly communicates with the plurality of flow paths.

For example, an outflow support may include at least one outflow port that shares a portion of a plurality of flow paths. The outflow support may have a manifold structure that guides flow of a refrigerant from the plurality of flow paths to one outflow port. For example, a plurality of outflow ports may share a pair of adjacent flow paths. In an example, "10" flow paths are provided and "5" outflow ports are provided.

FIG. 12 illustrates an example of an inflow support 1221 connected to the plurality of bars 121 and the upper frame 124.

Referring to FIG. 12, the plurality of bars 121 include connectors 1213 that connect the plurality of bars 121 to the support 122. Based on the above structure, structural rigidness of the cooling structure 12 is enhanced. Thus, a plurality of thin bars 121 can be manufactured, and an amount of a refrigerant flowing in the plurality of flow paths 123 can advantageously be increased, which is advantageous in terms of the flow rate of the refrigerant.

The connector 1213 is curved inwardly to contact the edge portion 113 of the battery cell 11 of FIG. 2. By the above structure, inflow and outflow of a refrigerant between a pair of adjacent flow paths 123 based on an arbitrary bar 121 are reduced. Thus, the refrigerant flows through the plurality of flow paths 123 at a designed flow rate.

Figure 13:
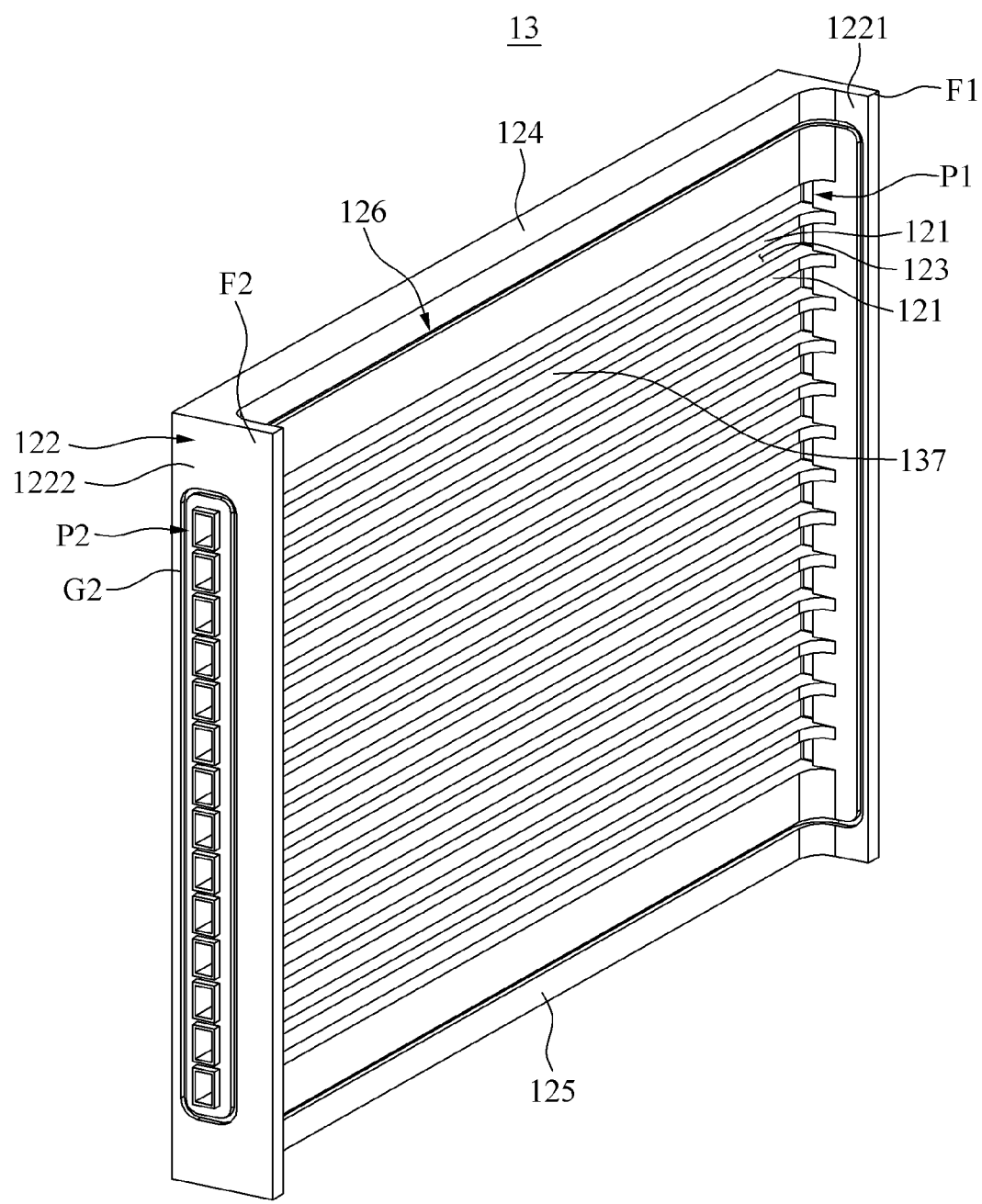
FIG. 13 is a perspective view illustrating an example of a cooling structure disposed on an outermost side of a battery system.

FIG. 13 is a perspective view illustrating an example of a cooling structure 13 disposed on an outermost side of a battery system.

Referring to FIG. 13, the cooling structure 13 includes the plurality of bars 121, the support 122 including the inflow support 1221 and the outflow support 1222, the plurality of flow paths 123, the upper frame 124, the lower frame 125 and the sealing portion 126 that are described above with reference to FIGS. 3 through 7, 9, 10 and 12. Also, the inflow support 1221 includes an inflow flange F1, an inflow passage P1 and a first sealing member (not shown), and the outflow support 1222 includes an outflow flange F2, an outflow passage P2 and a second sealing member G2.

In the cooling structure 13 disposed on the outermost side of the battery system 1 of FIG. 1, the inflow flange F1 and the outflow flange F2 extend only in one direction with respect to the plurality of bars 121, unlike a cooling structure 12 interposed between adjacent battery cells 11. Also, the sealing portion 126 is formed only on a side of the cooling structure 12 facing the large area portion 111 of the battery cell 11 of FIG. 2 supported and pressed by the cooling structure 12.

The cooling structure 13 disposed on the outermost side of the battery system 1 of FIG. 1 further includes a closing portion 137. The closing portion 137 defines the plurality of flow paths 123, together with a large area portion 111 of the battery cell 11 supported and pressed by the cooling structure 13, and a pair of adjacent bars 121. The closing portion 137 is formed of a material with a low thermal conductivity coefficient to form an enclosed heat exchange space. To enhance a structural stability, the plurality of bars 121 are fixed to the closing portion 137.

Figure 14:
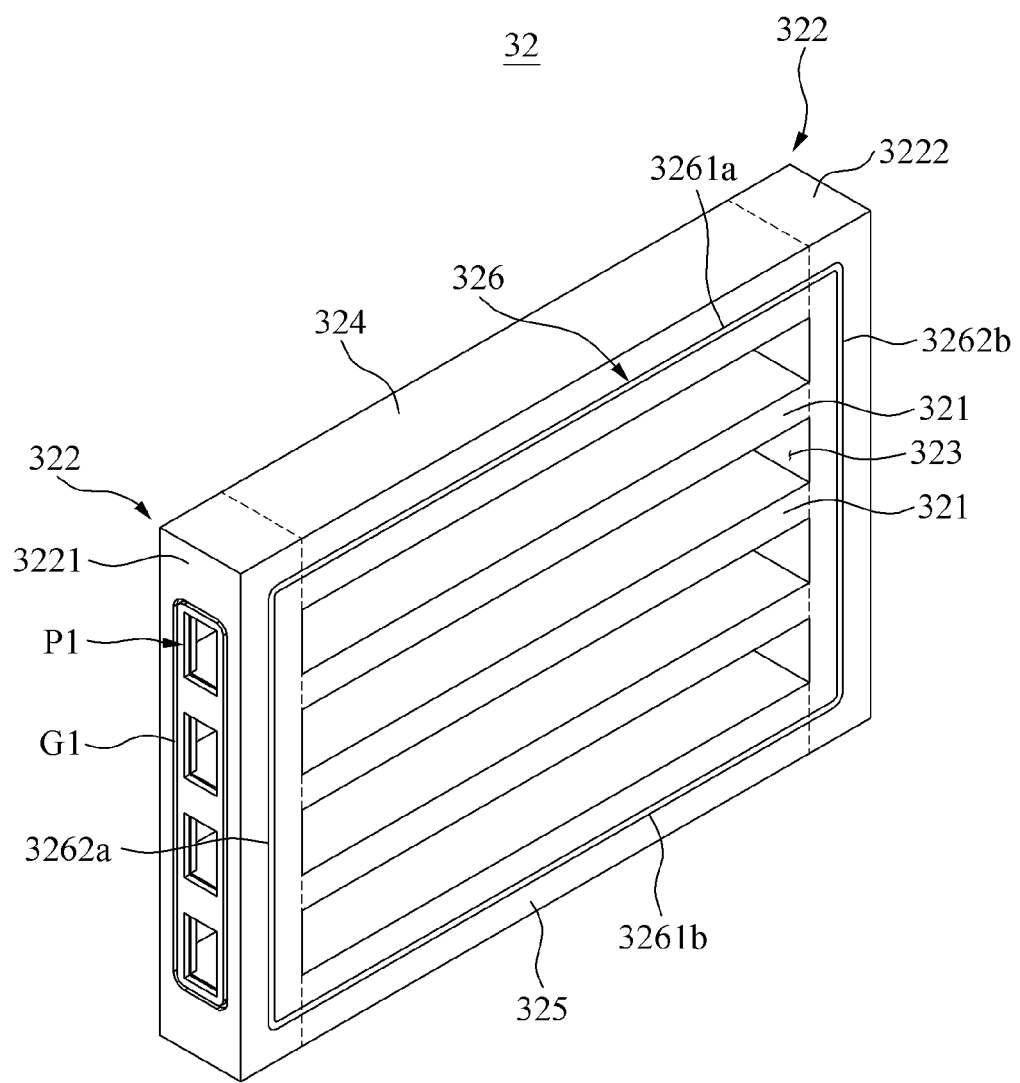
FIG. 14 is a perspective view illustrating an example of a cooling structure.

FIG. 14 is a perspective view illustrating an example of a cooling structure 32.

Referring to FIG. 14, the cooling structure 32 includes a plurality of bars 321, a support 322 including an inflow support 3221 and an outflow support 3222, a plurality of flow paths 323, an upper frame 324, a lower frame 325, and a sealing portion 326. The inflow support 3221 includes a plurality of inflow passages P1 that fluidly communicate with the plurality of flow paths 323, and a first sealing member G1 that encloses the plurality of inflow passages P1. The outflow support 3222 includes a plurality of outflow passages (not shown) that fluidly communicate with the plurality of flow paths 323, and a second sealing member (not shown) that encloses the plurality of outflow passages.

A thickness of the inflow support 3221 and a thickness of the outflow support 3222 are equal to a thickness of the upper frame 324 and a thickness of the lower frame 325. In other words, the cooling structure 32 has a shape of a rectangular parallelepiped. A two-dimensional (2D) sealing structure is formed by an upper longitudinal direction member 3261a, a lower longitudinal direction member 3261b, an inflow arrangement direction member 3262a and an outflow arrangement direction member 3262b of the sealing portion 326 that encloses the plurality of bars 321 and the plurality of flow paths 323.

Figure 15:
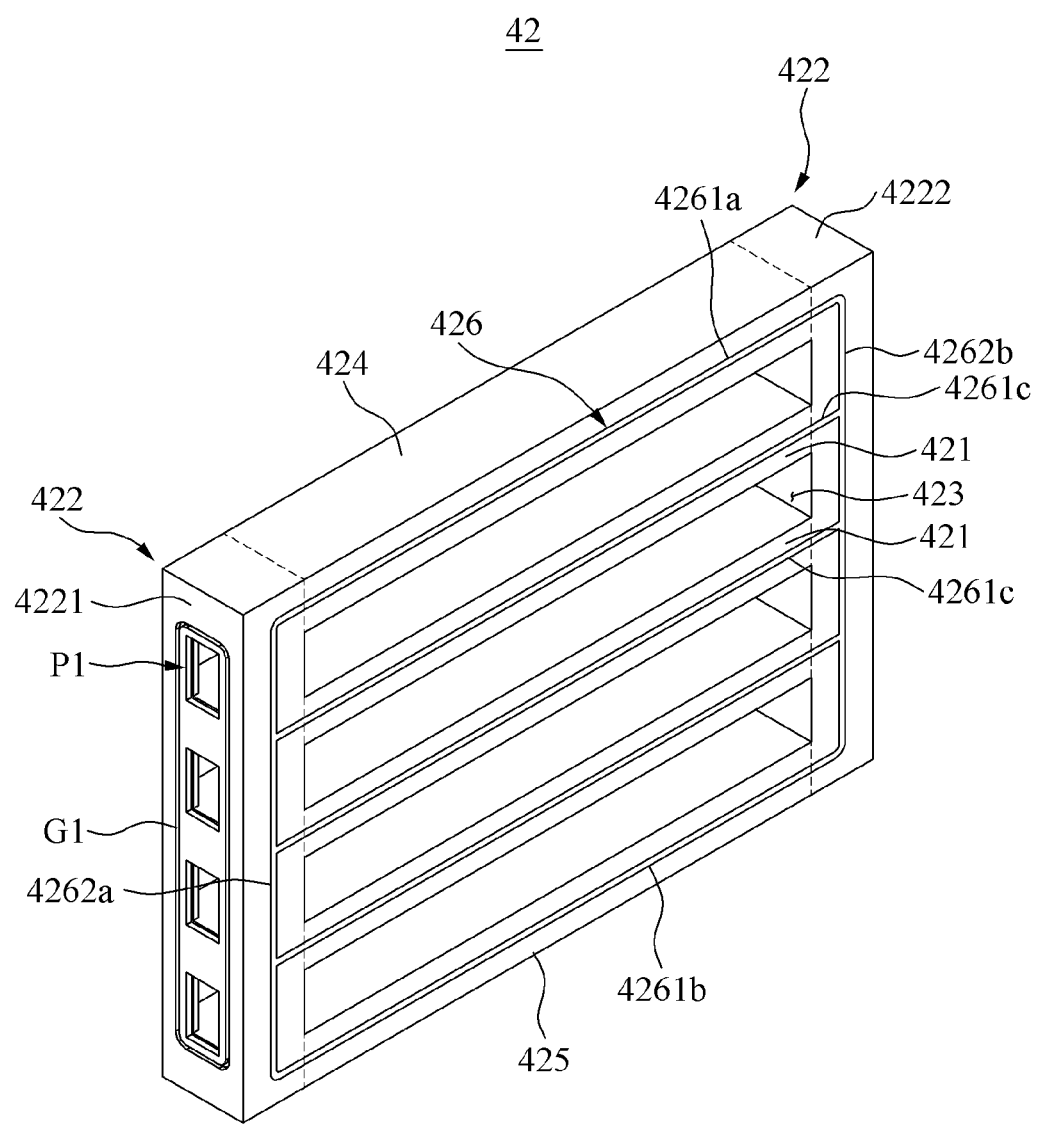
FIG. 15 is a perspective view illustrating an example of a cooling structure.

FIG. 15 is a perspective view illustrating an example of a cooling structure 42.

Referring to FIG. 15, the cooling structure 42 includes a plurality of bars 421, a support 422 including an inflow support 4221 and an outflow support 4222, a plurality of flow paths 423, an upper frame 424, a lower frame 425, and a sealing portion 426. The inflow support 4221 includes a plurality of inflow passages P1 that fluidly communicate with the plurality of flow paths 423, and a first sealing member G1 that encloses the plurality of inflow passages P1. The outflow support 4222 includes a plurality of outflow passages (not shown) that fluidly communicate with the plurality of flow paths 323, and a second sealing member (not shown) that encloses the plurality of outflow passages. A thickness of the inflow support 4221 and a thickness of the outflow support 4222 are equal to a thickness of the upper frame 424 and a thickness of the lower frame 425.

The sealing portion 426 encloses the plurality of bars 421 and the plurality of flow paths 423. The sealing portion 426 individually encloses the plurality of flow paths 423, to form a plurality of heat exchange spaces, together with a pair of adjacent bars 421 and surfaces of a pair of adjacent battery cells (not shown). For example, the sealing portion 426 includes an upper longitudinal direction member 4261a, a lower longitudinal direction member 4261b, an inflow arrangement direction member 4262a and an outflow arrangement direction member 4262b that extend along all boundaries of the plurality of bars 421 and the plurality of flow paths 423. The sealing portion 426 further includes a plurality of intermediate longitudinal direction members 4261c that are parallel to the upper longitudinal direction member 4261a and the lower longitudinal direction member 4261b, that are perpendicular to the inflow arrangement direction member 4262a and the outflow arrangement direction member 4262b, and that respectively extend along the plurality of bars 421.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A cooling structure comprising:
 a plurality of bars spaced apart from each other and configured to extend along a first surface of a battery cell;
 a support configured to support the plurality of bars;
 a plurality of flow paths defined by the first surface of the battery cell and a pair of adjacent bars of the plurality of bars, the plurality of flow paths being configured to guide flow of a coolant in contact with the first surface of the battery cell;
 a sealing portion configured to enclose the plurality of bars and the plurality of flow paths;
 an upper frame disposed above the plurality of bars in an arrangement direction of the plurality of bars; and
 a lower frame disposed below the plurality of bars in the arrangement direction of the plurality of bars,
 wherein the upper frame includes a first upper frame connector that connects the upper frame and the inflow support, and a second upper frame connector that connects the upper frame and the outflow support,
 wherein the lower frame includes a first lower frame connector that connects the lower frame and the inflow support, and a second lower frame connector that connects the lower frame and the outflow support,
 wherein the support comprises:
  an inflow support comprising an inflow passage configured to guide inflow of the coolant to the plurality of flow paths, and an inflow flange extending in a plane perpendicular to a longitudinal direction of the plurality of bars on first end portions of the plurality of bars; and
  an outflow support comprising an outflow passage configured to guide outflow of the coolant from the plurality of flow paths, and an outflow passage extending in a plane perpendicular to the longitudinal direction of the plurality of bars on second end portions opposite the first end portions of the plurality of bars, and wherein the sealing portion comprises:
an upper longitudinal direction member extending in a longitudinal direction of the plurality of bars and configured to contact the first surface of the battery cell, and installed in the upper frame;
a lower longitudinal direction member extending in the longitudinal direction of the plurality of bars and configured to contact the first surface of the battery cell, and installed in the lower frame;
an inflow arrangement direction member extending in the arrangement direction of the plurality of bars and configured to contact a second surface of the battery cell, and installed in the inflow flange;
an outflow arrangement direction member extending in the arrangement direction of the plurality of bars and configured to contact a second surface of the battery cell, and installed in the outflow flange;
a first upper connection member configured to connect the upper longitudinal direction member and the inflow arrangement direction member and to contact a first edge portion between the first surface and the second surface of the battery cell, and formed in the first upper frame connector;
a second upper connection member configured to connect the upper longitudinal direction member and the outflow arrangement direction member and to contact a second edge portion between the first surface and the second surface of the battery cell, and formed in the second upper frame connector;
a first lower connection member configured to connect the lower longitudinal direction member and the inflow arrangement direction member and to contact the first edge portion between the first surface and the second surface of the battery cell, and formed in the first lower frame connector; and
a second lower connection member configured to connect the lower longitudinal direction member and the outflow arrangement direction member and to contact the second edge portion between the first surface and the second surface of the battery cell, and formed in the second lower frame connector.

2. The cooling structure of claim 1, wherein:
the inflow passage comprises a plurality of inflow ports,
the outflow passage comprises a plurality of outflow ports,
one end of each of the plurality of bars is connected between a pair of adjacent inflow ports, and
another end of each of the plurality of bars is connected between a pair of adjacent outflow ports.

3. The cooling structure of claim 1, wherein:
the inflow support further comprises a first sealing member configured to enclose the inflow passage, and
the outflow support further comprises a second sealing member configured to enclose the outflow passage.

4. The cooling structure of claim 3, wherein the first sealing member is configured to enclose the inflow passage to form a closed loop, and the second sealing member is configured to enclose the outflow passage to form another closed loop.

5. The cooling structure of claim 1, further comprising:
a plurality of connectors configured to connect the support to the first end portions and the second end portions of each of the plurality of bars, respectively.

6. The cooling structure of claim 5, wherein the connectors are curved inwardly to be configured to contact an edge portion the battery cell.

7. The cooling structure of claim 1, wherein the support and the plurality of bars are formed of insulative materials.

8. The cooling structure of claim 1, wherein:
a thickness of the upper frame and a thickness of the lower frame are greater than a thickness of the plurality of bars in the arrangement direction of the plurality of bars, and
the upper frame and the lower frame are formed of a more flexible material than a material of the plurality of bars.

9. The cooling structure of claim 1, wherein the first surface of the battery cell is larger than plural other surfaces of the battery cell.

10. The cooling structure of claim 1, wherein the plurality of flow paths are in contact with only a central portion of the battery cell in an arrangement direction of the plurality of bars.

11. The cooling structure of claim 1, wherein:
the plurality of bars are arranged in a vertical direction of the battery cell, and
a gap between a pair of adjacent bars in a central portion of the battery cell in the vertical direction is greater than a gap between a pair of adjacent bars in an upper portion or a lower portion of the battery cell in the vertical direction.

12. The cooling structure of claim 1, further comprising:
the battery cell and a second battery cell; and
the plurality of bars, the support, and the plurality of flow paths are interposed between the battery cell and the second battery cell.

* * * * *